the briquets to disintegrate but kept above the fusing point of the cast or pig iron particles. Under this heat treatment the saw-dust is oxidized and disappears, leaving the briquet porous and readily accessible to heat. A portion of the oxid is reduced through the medium of the metalloids present in the finely comminuted iron which fuses and coats the particles of oxid, with the result that the particles of new iron stick together and the briquet becomes an adherent mass with a consistency and a capacity for resisting pressure which are almost metallic. A certain proportion of the carbonaceous material disappears and the rest of it remains in the briquet. The product can now be added to an open hearth furnace either by being charged upon the hearth or being added to the bath. The briquets being held together and resisting disintegration, the metalloids of the pig iron continue their reducing effect under the influence of the heat of the hearth and by the proper proportions I am thus enabled to utilize the crude iron as a reducing agent for the oxids, and at the same time to use, as a source of iron, oxids not hitherto available. The usual proportions which I employ in the original mixture, in order that the briquets shall, when fused, result in a good grade of fusible metal, are about 50 to 75 parts ore to 50 to 25 parts pig iron. The carbonaceous material runs from about one sixth to one tenth of the weight of ore.

UNITED STATES PATENT OFFICE.

HORACE W. LASH, OF CLEVELAND, OHIO.

MATERIAL FOR USE IN REFINING IRON AND PROCESS OF PREPARING THE SAME.

No. 864,972.   Specification of Letters Patent.   Patented Sept. 3, 1907.

Application filed December 31, 1906. Serial No. 350,103.

*To all whom it may concern:*

Be it known that I, HORACE W. LASH, a citizen of the United States, residing at Cleveland, in the county of Cuyahoga and State of Ohio, have invented a certain new and useful Improvement in Material for Use in Refining Iron and Process of Preparing the Same, of which the following is a full, clear, and exact description.

My invention relates to a material for use in refining iron and the process of preparing the same. The particular object of my invention is to make use of the iron sands and finely comminuted oxids of iron occurring in various forms which are not now capable of practical utilization.

I have discovered that, when properly treated, oxids may be utilized so as to obtain the full value of iron contained therein. Particularly I find that when mixed with finely comminuted cast or pig iron and certain additional substances and the mixture subjected to a proper degree of heat below the fusing point of the mass and above the fusing point of the cast or pig iron contained in the mixture, the resultant material, which varies somewhat in its character and which can be controlled as to its composition, is available for use in refining iron. This material is especially available in either the acid or the basic open hearth processes of making steel.

In practice I select, preferably, such oxids as magnetic concentrates or such as are found among the sand ores of the St. Lawrence river valley, and mix these ores with finely comminuted iron which shall be of that quality commonly designated as cast or pig iron, as distinguished from the ordinary run of scrap, wrought iron or steel,—it being important that the iron shall contain a high percentage of metalloids, or easily oxidizable metals such as manganese, capable of uniting with the oxygen of the ore.

In addition to the finely divided iron ore and pig iron, I add finely divided carbon. These substances may all of them be ground to a state of comminution before the mixing is effected, or the grinding may take place simultaneously with the mixing. I may also add a readily combustible material such as saw-dust to the mass, and frequently employ a temporary binder such as molasses, silicate of soda or pitch.

Inasmuch as it is my purpose to treat these materials to make a proper addition to a refining bath, I may press the mixture into the form of briquets after having added some solid, readily combustible, material such as saw-dust, and occasionally a temporary binder, such as pitch, which shall serve the purpose of holding the briquets together until subjected to heat treatment. These briquets are then heated in an oven or furnace for a period of time, the temperature being kept below the fusing point of the mass so that there will be no tendency on the part of When it is desired that my briquets shall serve as a substitute for part or all of the scrap commonly used in the open hearth practice, as they obviously may do, I lower the proportion of carbon somewhat so that the briquets shall, upon being fused in the hearth, add thereto a quality of metal substantially equivalent to scrap.

The heat treatment of the briquets is an essential characteristic of this invention, as it, by effecting a reduction of some of the oxid, produces an adhering mass which may be handled without fear of breakage or disintegration.

By the expression "briquets" herein used I do not of course limit myself to any definite geometrical form, but use the expression broadly, as understood in art to refer to any mass of material without regard to regularity of contour or particular size, so long as it is a mass capable of being handled in the way described.

I sometimes employ a little flux material in the mixture which aids by its individual action in binding the briquets together, on being subjected to the heat treatment.

Having described my invention I claim:

1. A material, for use in obtaining refined iron, comprising coherent masses having a consistency and resistance to pressure almost metallic formed by subjecting finely divided iron oxid, finely divided cast iron and carbonaceous material to a heat below the fusing point of the mass and above the fusing point of the finely divided cast iron.

2. A material, for use in obtaining refined iron, comprising coherent masses having a consistency and resistance to pressure almost metallic formed by subjecting a mixture comprising finely divided iron oxid, finely divided cast iron, carbonaceous material and a readily combustible material to a heat below the fusing point of the mass.

3. A material, for use in obtaining refined iron, comprising coherent masses having a consistency and resistance to pressure almost metallic formed by subjecting a mixture comprising finely divided iron oxid, finely divided cast iron, carbonaceous material and saw dust to a heat below the fusing point of the mass.

4. The process of preparing material for use in refining iron which comprises mixing together finely divided iron oxid, finely divided cast iron and finely divided carbonaceous material and subjecting the mixture to a heat below the fusing point of the mass and above the fusing point of the finely divided cast iron.

5. The process of preparing material for use in refining iron which comprises mixing together finely divided iron oxid, finely divided cast iron, finely divided carbonaceous material and a finely divided readily combustible material and subjecting the mixture to a heat below the fusing point of the mass.

In testimony whereof, I hereunto affix my signature in the presence of two witnesses.

HORACE W. LASH.

Witnesses:
E. B. GILCHRIST,
H. R. SULLIVAN.